(12) United States Patent
Bowra et al.

(10) Patent No.: US 7,788,395 B2
(45) Date of Patent: Aug. 31, 2010

(54) ADAPTIVE MEDIA PLAYBACK

(75) Inventors: Todd Bowra, Redmond, WA (US);
Nicholas Fang, Redmond, WA (US);
Ashley Speicher, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 11/706,086

(22) Filed: Feb. 14, 2007

(65) Prior Publication Data

US 2008/0195744 A1    Aug. 14, 2008

(51) Int. Cl.
*G06F 15/16*    (2006.01)

(52) U.S. Cl. .................. 709/231; 709/230; 709/246; 386/99; 386/125; 348/515; 348/14

(58) Field of Classification Search ............... 709/231
See application file for complete search history.

(56) References Cited

U.S. PATENT DOCUMENTS

| | | | |
|---|---|---|---|
| 5,231,492 A | 7/1993 | Dangi et al. | |
| 6,016,166 A * | 1/2000 | Huang et al. | 348/515 |
| 6,078,725 A | 6/2000 | Tanaka | |
| 6,157,674 A | 12/2000 | Oda et al. | |
| 6,275,537 B1 | 8/2001 | Lee | |
| 6,301,248 B1 | 10/2001 | Jung et al. | |
| 6,535,486 B1 | 3/2003 | Naudus et al. | |
| 6,735,633 B1 | 5/2004 | Welch et al. | |
| 6,847,623 B1 | 1/2005 | Vayanos et al. | |
| 6,879,634 B1 | 4/2005 | Oz et al. | |
| 7,075,924 B2 | 7/2006 | Richter et al. | |
| 2005/0010850 A1 * | 1/2005 | Driessen et al. | 714/758 |
| 2005/0238020 A1 * | 10/2005 | Hetzel et al. | 370/390 |
| 2005/0262251 A1 * | 11/2005 | Klemets et al. | 709/230 |
| 2006/0177199 A1 | 8/2006 | Horiguchi et al. | |
| 2007/0160350 A1 * | 7/2007 | Ikeda et al. | 386/99 |
| 2008/0052745 A1 * | 2/2008 | Li et al. | 725/58 |
| 2008/0256091 A1 * | 10/2008 | Kampmann et al. | 707/100 |
| 2008/0256272 A1 * | 10/2008 | Kampmann et al. | 710/57 |

OTHER PUBLICATIONS

Ahmed et al., "IP Video Streaming With Fine-Grained TCP-Friendly Rate Adaptation", Date: 2003, http://bcr2.uwaterloo.ca/~rboutaba/Papers/Conferences/MMNS-03.pdf.

Chakareski et al., "R-D Hint Tracks for Low-Complexity R-D Optimized Video Streaming", Date: Apr. 20, 2004, http://www.hpl.hp.com/techreports/2004/HPL-2004-71.pdf.

Pancha et al., "Prioritized Transmission of Variable Bit Rate MPEG Video", Date: 1 992, http://ieeexplore.ieee.org/iel2/645/6841/00276572.pdf?isNumber=.

* cited by examiner

*Primary Examiner*—Firmin Backer
*Assistant Examiner*—Natisha Cox

(57) ABSTRACT

Described herein is technology for, among other things, performing playback in resource-limited environments. The technology involves identifying one or more primary streams and one or more secondary streams of a piece of media content based on the media content itself and/or on the particular playback scenario and then modifying playback and streaming parameters accordingly. The one or more primary streams may then be given priority in order to ensure a satisfactory playback experience. The playback characteristics, the one or more primary streams of the media content, and the resources available in the playback environment can be monitored and changed throughout playback. Both the device streaming and the device receiving the content may communicate to further optimize playback.

20 Claims, 7 Drawing Sheets

ADAPTIVE MEDIA PLAYBACK

BACKGROUND

Computer networks couple various types of computer systems in a manner that enables the network coupled computer systems to access data from a variety of sources of information. Some computer networks allow media content to be streamed from one or more network coupled sources of media content to one or more network coupled receivers of media content. In such computer networks, media content can be streamed by media content servers and played back by media content playback systems that are associated with the media content receivers. For example, a user may select a recorded television program stored on a media server for playback on a media receiver.

In order to ensure a good user experience, the playback system should be able to provide a satisfactory playback experience on such a network coupled receiver. That experience should be the same as or near to the experience provided during playback directly on the device which holds the desired content. Satisfactory playback, among other things, can require smooth and continuous playback of both audio and video components. For example, in the case of streaming media, playback performance can be impacted by parameters and performance of the media source and network resources. Thus, satisfactory playback of streaming content requires reliability of the network resources associated with playback.

The reliability of network resources can vary significantly as network conditions change over time. Network characteristics that can impact playback of streaming content include, among other things, the available and maximum bandwidth of the network. For example, in either case, there may be 5 megabits of bandwidth available while the streaming content requires 6 megabits for playback. Further, the available bandwidth on a given network may vary greatly over a short period of time. Thus, available network resources may not allow a playback device to timely receive the data necessary for satisfactory playback.

Additionally, the characteristics of the source content can impact the ability to provide a satisfactory playback experience over a network. The quality and type of a piece of content determines the bandwidth required for playback. For example, a piece of media content may have multiple audio and video tracks each of which have varying bit-rates meaning that playback requires the ability to handle substantial changes in bandwidth requirements.

Source reliability can further adversely impact the playback of streaming media. For example, if the source of the streaming media is a broadcast antenna, the signal may be interrupted or weakened by a weather storm. The data stream of the content may therefore be interrupted and impact the playback experience. Conventional playback systems attempt to play all of a piece of media and such an interruption may mean that both audio and video playback are halted because less than all of the data is available. This can reduce the quality of the user experience significantly. Similarly, if a file is recorded from a wireless source, the recorded file can reflect signal interruptions and be degraded.

In both cases, the variations in source and network resource reliability can individually and in combination detrimentally impact the quality throughout the playback experience. Thus, conventional systems are not well equipped to deal with variations in source and network reliability.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, performing playback in resource-limited environments. It may be implemented via a playback device receiving streaming content on a home network. The technology involves identifying one or more primary streams and one or more secondary streams of a piece of media content and then modifying playback and streaming parameters accordingly. The one or more primary streams may then be given priority over the one or more secondary streams in order to ensure a satisfactory playback experience. The playback characteristics, the primary stream or streams of a piece of media content, and the available resources of the playback environment can be monitored and changed throughout playback. Both the device sourcing the content and the device receiving the content may communicate with each other to further ensure satisfactory playback. Thus, it is possible to achieve high quality playback experiences of content on devices in environments where satisfactory playback would otherwise not be possible.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Figure 1:
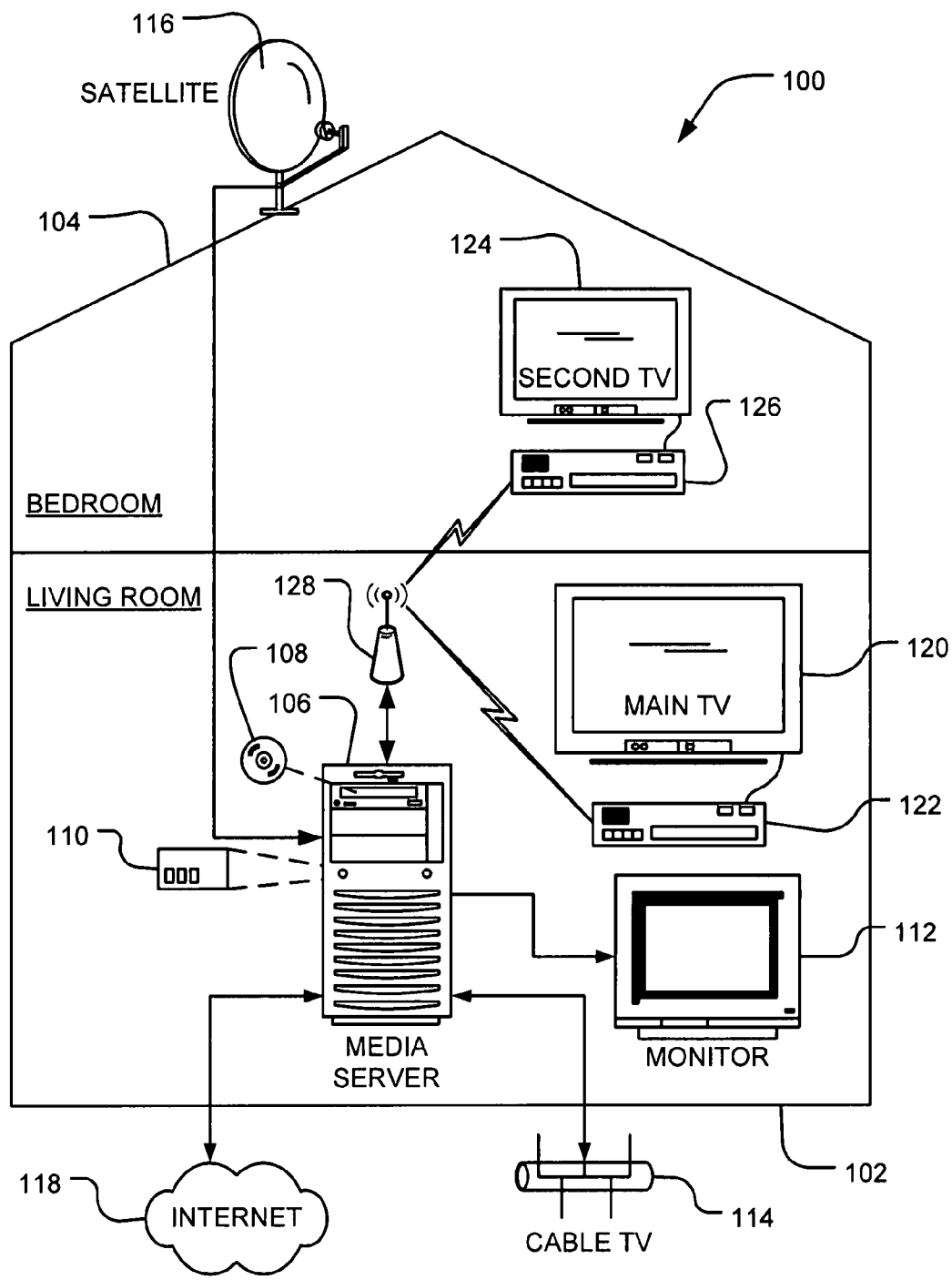
FIG. 1 shows a home entertainment operating environment according to one embodiment.

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Described herein is technology for, among other things, performing playback in resource-limited environments. It may be implemented via a playback device receiving streaming content on a home network. The technology involves identifying one ore more primary streams and one or more secondary streams of a piece of media content and then modifying playback and streaming parameters accordingly. The one or more primary and one or more secondary streams may be identified based on the overall content or a particular playback situation. The primary stream or streams are given priority over the one or more secondary streams in order to ensure a satisfactory playback experience. The playback characteristics, the primary stream or streams of a piece of media content, and the available resources of the playback environment can be monitored and changed throughout playback. Both the device sourcing the content and the device receiving the content may communicate with each other to further ensure satisfactory playback.

FIG. 1 shows an exemplary home operating environment according to one embodiment. In a home entertainment operating environment 100 such as is shown in FIG. 1, media receivers 122 and 126 can be placed in communication with media server 106 through network 128 (for example a local area network (LAN)). In an exemplary embodiment, the media receivers 122, 126 can be Media Center Extender devices, for example, an Xbox 360™ (Microsoft Corporation, Redmond, Wash.).

In addition to the aforementioned Media Center Extender devices, media receivers 122 and 126 can also include a variety of conventional media rendering or computing devices, including, for example, a set-top box, a television, a video gaming console, a desktop PC, a notebook or portable computer, a workstation, a mainframe computer, an Internet appliance, a handheld PC, a Digital Audio Player (DAP), a Digital Video Player (DVP), a Digital Video Recorder (DVR), a cellular telephone or other wireless communications device, a personal digital assistant (PDA), or combinations thereof.

Network 128 can comprise a wired and/or a wireless network. In one embodiment, network 128 can include but is not limited to, for example, cable 114, Ethernet, WiFi, a wireless access point (WAP), or any other electronic coupling means, including the Internet 118. It should be appreciated that network 128 can accommodate communication between media server 106, media receivers 122 and 126 and any other coupled device through packet-based communication protocols, such as transmission control protocol (TCP), internet protocol (IP), real-time transport protocol (RTP), real-time transport control protocol (RTCP), and hypertext transfer protocol (HTTP). In one embodiment, communications can be transmitted directly between devices over a LAN, or they may be carried over a wide area network (WAN), for example, the Internet 118.

In one embodiment, as is shown in FIG. 1, one or more video display devices, for example a main TV 120 in a first room (e.g., living room 102), a secondary TV 124 in a second room (e.g., bedroom 104), and a video monitor 112 can be situated at disparate locations in home operating environment 100. Main TV 120 and secondary TV 124 can be coupled to media receivers 122 and 126 through conventional cables. In another embodiment, main TV 120 and secondary TV 124 can be coupled to media receivers 122 and 126 via wireless transmissions.

Video monitor 112 can be coupled to media server 106 directly via a video cable or via wireless transmissions. Media server 106 and media receivers 122 and 126 can also or alternatively be coupled to any of a variety of other video and audio presentation devices. Importantly, media content, including TV content, can be supplied to each of the video display devices 112, 120 and 124 over home network 128 from a media server (e.g., 106) that can be situated in a remote room (e.g. living room 102).

Media receivers 122, 126 can be configured to receive streamed media content, including video and TV content, from media server 106. Media content, particularly video and TV content, can be transmitted from the media server 106 to media receivers 122 and 126 as streaming media comprised of discrete content packets via any of the network protocols described above. The streamed media content can comprise standard definition, and high definition content, including video, audio, and image files, decoded on media receivers 122 and 126 for presentation on the coupled TVs 120 and 124. The streaming media content can be video or audio streamed over the Internet.

The media content can further be "mixed" with additional content, for example, an Electronic Program Guide (EPG), presentation content related to the media content, a web browser window, and other user interface environments transmitted from the media server for presentation on TVs 120 and 124 or monitor 112. Such additional media content can be delivered in a variety of ways using different protocols, including, for example, standard remote desktop protocol (RDP), graphics device interface (GDI), or hypertext markup language (HTML).

In addition to the media receivers 122 and 126 and video display devices 112, 120 and 124, media server 106 can be coupled to other peripheral devices, including components such as digital video recorders (DVR), cable or satellite set-top boxes, speakers, and a printer (not shown for the sake of graphic clarity). Media server 106 and media receivers 122 and 126 can also enable multi-channel output for speakers. This can be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) surround decoding.

Figure 2:
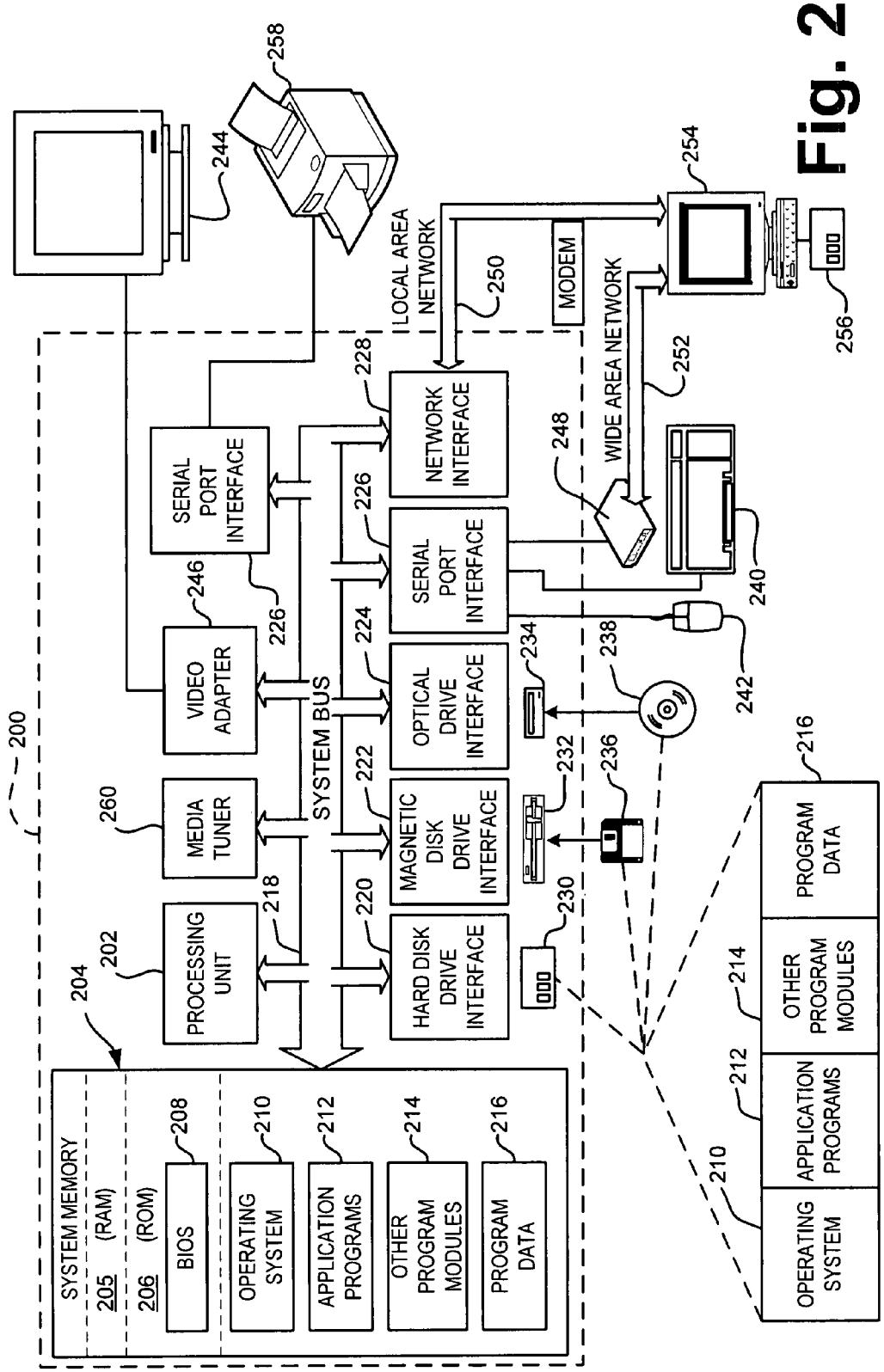
FIG. 2 shows an exemplary hardware operating environment according to one embodiment.

FIG. 2 shows an exemplary hardware operating environment according to one embodiment. As discussed with reference to FIG. 1, media server 106 (shown in FIG. 1), and media receiver devices 122 and 126 (shown in FIG. 1) can comprise general purpose computing devices. Moreover, a general purpose computing device can encompass a computer 200 that includes a processing unit 202, a system memory 204 and a system bus 218 that operatively couples various system components including the system memory 204 to the processing unit 202. In one embodiment, there can be one or more processing units (e.g., 202), such that processing unit 202 can comprise a single central processing unit (CPU), or a plurality of processing units (e.g., a parallel processing environment). In one embodiment, computer 200 may be a conventional computer, a distributed computer, or any other type of computer.

The system bus 218 may be any of several types of bus structures including a memory bus or memory controller, a peripheral bus, a switched fabric, point-to-point connections, and a local bus using any of a variety of bus architectures. The system memory 204 can include read only memory (ROM) 206 and random access memory (RAM) 205. A basic input/output system (BIOS) 208, containing the basic routines that help to transfer information between elements within the computer 200, such as during start-up, can be stored in ROM 206. The computer 200 can further include a hard disk drive 230 for reading from and writing to a hard disk, not shown, a magnetic disk drive 232 for reading from or writing to a removable magnetic disk 236, and an optical disk drive 234 for reading from or writing to a removable optical disk 238 such as a CD ROM, DVD, or other optical media.

As shown in FIG. 2, the hard disk drive 230, magnetic disk drive 232, and optical disk drive 234 can be connected to the system bus 218 by a hard disk drive interface 220, a magnetic disk drive interface 222, and an optical disk drive interface 224, respectively. In one embodiment, the drives and their associated computer-readable media provide nonvolatile storage of computer-readable instructions, data structures, program modules and other data for the computer 200. It should be appreciated by those skilled in the art that any type of computer-readable media that can store data that is accessible by a computer, for example, magnetic cassettes, flash memory cards, digital video disks, RAMs, and ROMs, can be used in the exemplary operating environment shown in FIG. 2.

A number of program modules can be stored on hard disk 230, magnetic disk 236, optical disk 238, ROM 206, or RAM 205, including an operating system 210, one or more application programs 212, (e.g., a multimedia software package) other program modules 214, (e.g., a visualization engine, an audio/video decoder, a UI generator, and a metadata decoder) and program data 216 (e.g., media content). Moreover, a user can enter commands and information into the computer 200 through input devices such as a keyboard 240 and a pointing device 242 (e.g., a mouse). Other input devices (not shown) can include but are not limited to a microphone, a remote control, a joystick, a game pad, a tablet, a touch screen device, a satellite dish, a scanner, a facsimile machine, and a video camera. These and other input devices are often connected to processing unit 202 through a serial port interface 226 that is coupled to system bus 218, but can be connected by other interfaces, such as a parallel port, a game port, or a universal serial bus (USB).

A monitor 244 or other type of display device can also be connected to system bus 218 via an interface, such as a video adapter 246. In addition to monitor 244, computers typically include other peripheral output devices, such as a printer (e.g., 258) and speakers (not shown). These and other output devices can be connected to processing unit 202 through a serial port interface 226 that is coupled to system bus 218, but can be connected by other interfaces, such as parallel port, game port, or universal serial bus (USB). In the case of a media server, a tuner 260 can also be connected with system bus 218 in order to receive and convert analog content signals into digital format and similarly convert digital content into analog signals for transmission to connected devices.

Computer 200 can operate in a networked environment using logical connections to one or more remote computers, such as remote computer 254. These logical connections can be achieved by means of a communication device that can be coupled to or integral with computer 200. It should be appreciated that the invention is not limited to a particular type of communications device. Remote computer 254 can be another computer, a server, a router, a network personal computer, a client, a peer device, a media receiver (discussed above), or other common network node, and can include many or all of the elements described above relative to computer 200, although only a memory storage device 256 is illustrated in FIG. 2. It should be appreciated that the logical connections depicted in FIG. 2 can include a wired or wireless local-area network (LAN) 250, for example, an Ethernet network, or a WiFi network, and a wide-area network (WAN) 252, for example, a cable network or a telephony network. Such networking environments are commonplace in office networks, enterprise-wide computer networks, intranets, and the Internet, which are all types of networks.

In one embodiment, when employed in a LAN 250 environment, computer 200 can be connected to local network 250 through a network interface or adapter 228, which is a type of communications device. Moreover, when employed in a WAN 252 environment, computer 200 can include a modem 248, a network adapter, or any other type of communications device for establishing communications over the wide area network 252. The modem 248, which can be internal or external, can be connected to the system bus 218 via the serial port interface 226. In a networked environment, program modules depicted relative to the personal computer 200, or portions thereof, can be stored in a remote memory storage device. In the case of a media server, the media server may send and receive content and content requests through LAN 250 and WAN 252. It is appreciated that the network connections shown are exemplary and other means of establishing a communications link between the computers can be used.

Figure 3:
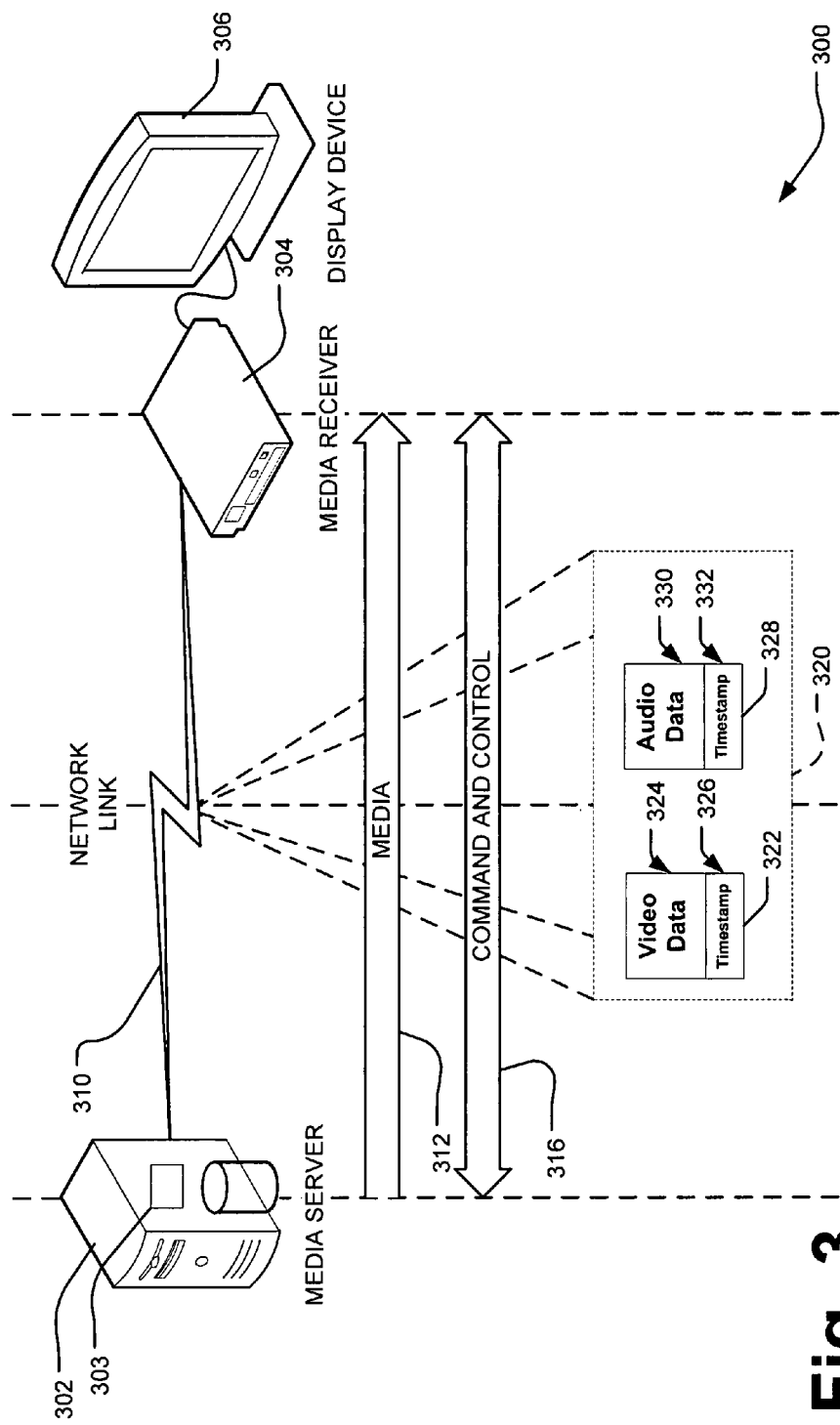
FIG. 3 shows an exemplary network operating environment of a system for playback, in accordance with an embodiment.

FIG. 3 shows an exemplary network operating environment 300 of a system 303 for playback of media content in accordance with an embodiment. Exemplary network operating environment 300 may be implemented on the operating environments described above. Exemplary network operating environment 300 includes: media server 302, network link 310, media receiver 304, display device 306, and system 303 for media content playback.

Media server 302 is an exemplary computing system 200 as described above capable of providing and receiving media in a home network environment as discussed above in relation to FIG. 1. Network link 310 allows media server 302 to provide media 312 and facilitates command and control 316 between media server 302 and media receiver 304. In one embodiment, media server 302 contains system 303 for media content playback. It is appreciated that system 303 can be contained in a server, a media receiving device, a separate third device or a combination thereof.

System 303 facilitates the satisfactory playback of media content in environments where satisfactory playback would otherwise not be possible. System 303 facilitates satisfactory playback of media content by examining the streams in a piece of media content and identifying one or more primary streams and one or more secondary streams. Then system 303 adjusts playback parameters to favor the one or more primary streams over the one or more secondary streams. For example, system 303 may identify an audio stream of a piece of video content as the primary stream and adjust playback parameters accordingly so that audio playback is favored over the secondary stream of video thereby allowing the audio stream to play smoothly. It is appreciated that system 303 may dynamically adjust playback parameters throughout content playback.

Display device 306 is coupled to media receiver 304 which allows a user to view media 312. In one embodiment, display device 306 may be a computer monitor or television such as televisions 120 and 124 as discussed above in relation to FIG. 1. The graphical user interface (GUI) displayed on display device 306 may feature large graphical elements such that the GUI may be visible from a distance.

Media receiver 304 may receive input from a user through a remote control. Media receiver 304 may handle the user commands directly or partially and pass all or part of the commands to media server 302 via network link 310. Thus, the user may browse and view content on media server 302 on display device 306 via media receiver 304 and network link 310.

Referring to FIG. 3, media server 302 sends exemplary media content stream 320 over network link 310 to media receiver 304 for playback. Media content stream 320 includes video stream 322 and audio stream 328. It is appreciated that media content stream 320 can include multiple streams of audio and/or video and may contain other types of streams. Video stream 322 is composed of blocks which include a video data portion 324 and corresponding timestamp 326. Each block of audio stream 328 contains an audio data portion 330 and corresponding timestamp 332. Media receiver 304 has a render clock which keeps track of the current playback time position in a piece of media content. The render clock determines based on timestamps which samples (e.g. audio and video) to play. For example, when the render clock is at five seconds media receiver 304 will play audio and video samples having a timestamp of five seconds.

Figure 4:
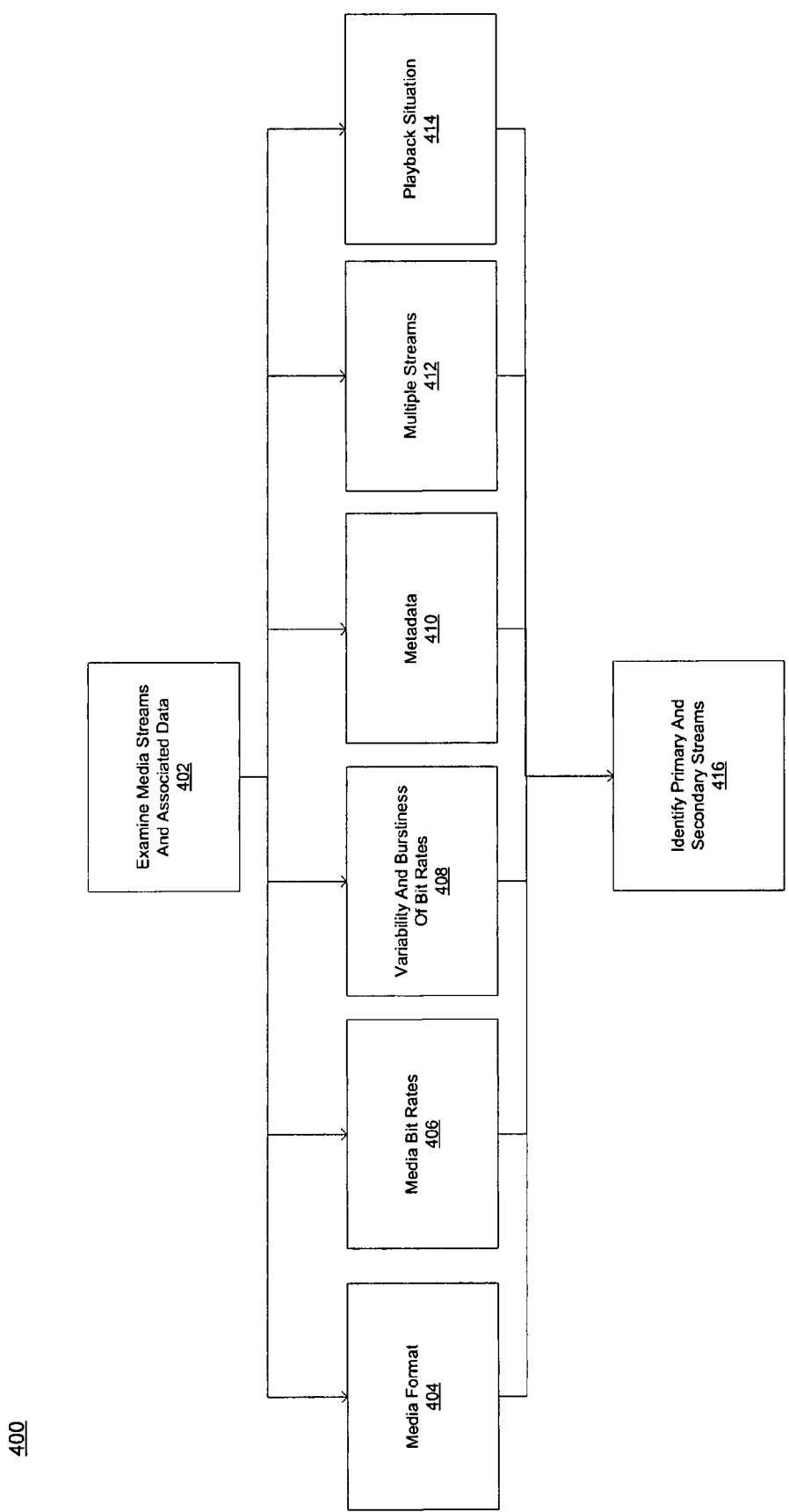
FIG. 4 is a flowchart of a process for identifying one or more primary streams and one or more secondary streams, in accordance with an embodiment.

FIG. 4 is a flowchart of an exemplary process 400 for determining one or more primary streams and one or more secondary streams of a piece of media content, in accordance with an embodiment. Process 400 may be implemented on the operating environments described above. Process 400 is well-suited to be stored as instructions on a computer-readable medium. In an exemplary embodiment, process 400 operates on a media server or a media receiver. It is appreciated that not all steps of process 400 are necessary for the general goal of process 400 to be achieved. Moreover, it is appreciated that additional steps may also be included in process 400 in accordance with alternative embodiments.

At step 402, examination of a plurality of characteristics of a plurality of media streams in a piece of media content and associated data begins. Examination can begin prior to playback, for example just after a piece of media content has been selected by a user, as well as throughout playback. It is appreciated there may be situations where there are numerous streams of the same type and thus there may be more than one primary stream and one or more secondary streams. After the primary stream or streams and one or more secondary streams have been identified, playback and stream parameters can be adjusted to ensure satisfactory playback.

At step 404, the media formats are examined for various inherent characteristics of the formats such as whether there are some streams that are reliable (guaranteeing a constant delivery rate of samples with media data) while other streams are sparse or sporadic (in which the delivery rate may fluctuate over time). For example, examination of a slideshow media file may find that it includes a reliable video stream and a sparse audio stream.

At step 406, the audio stream's bit-rate is compared to the audio bit-rate commonly used to accompany video streams encoded at the bit-rate of the associated video stream. For example, video content encoded at 500 kbps may typically have an associated 32 kbps audio stream. If the video stream has a bit-rate of 500 kbps and the audio stream has a bit-rate of 384 kbps, this might suggest that the audio stream is more important than the video stream due to its bit-rate being well above a typical audio bit-rate for the given video bit-rate.

At step 408, the variability and burstiness of the bit-rates of the plurality of streams is examined. The streams may particularly be examined for characteristics such as sporadic bursts of data among periods of little or no data. For example with a cable music channel there may be several minutes of audio during which there are occasional video samples containing album art or trivia information. The bit-rate of the audio stream is relatively constant while the video stream is at zero for extended periods of time before spiking occasionally.

At step 410, the metadata associated with the content is examined. The examination of the metadata can be particularly useful when the format or relative importance of the streams is unknown. The metadata may indicate the area or media category where a user is browsing in a media environment. For example, if a user is browsing an electronic program guide (EPG), metadata such as channel information may be available which indicates that a user is browsing an area with cable music channels. Thus, the metadata indicates that these channels deliver an experience that is audio-centric, and therefore that the audio stream is primary.

At step 412, the plurality of streams is examined for the streams that are currently selected or actively being viewed or listened to by a user. For example in the case of a piece of content having multiple audio streams containing different languages and multiple video streams having different camera angles, a user will usually only be actively viewing or listening to a subset of the streams (e.g. one video and one audio stream) at a single time.

At step 414, one or more primary streams are identified based on the current playback situation. A primary stream or streams may be identified for the content overall or based on the current playback situation. For example, during a channel change on a TV feed, the video stream may be identified as the primary stream to optimize playback for displaying a video frame to the user as the user cycles through TV channels. However, at steady state watching one channel, the audio stream may be identified as the primary stream so as to optimize playback to avoid any audio glitches or drop outs.

At step 416, the plurality of stream characteristics examined are used to identify one or more primary streams and one or more secondary streams. It is appreciated that one or more of the characteristics examined can be used individually or in combination to identify one or more primary streams and one or more secondary streams. For example, if the media content includes an English audio track and Spanish audio tracks along with high quality video, the high quality video stream may be identified as a primary stream while the audio streams are identified as secondary streams.

In one embodiment, one or more primary streams can be identified based on the inherent relationship of the streams to each other in a media stream. For example, where the format is a slideshow format having a relatively reliable video stream along with a sporadic audio stream, the video stream is identified as the primary stream and the audio stream as the secondary stream because the video stream is reliable which will allow playback to begin as soon as the video stream has been adequately buffered instead of waiting for the sparse audio stream.

If the audio stream's bit-rate is much greater than the audio bit-rate commonly used to accompany video streams encoded at the bit-rate of the associated video stream, it may indicate that the audio stream is more important than the other streams and was encoded accordingly at a higher quality. For example, video content encoded at 500 kbps may typically have an associated 32 kbps audio stream. If the video stream has a bit-rate of 500 kbps and the audio stream has a bit-rate of 384 kbps, this might suggest that the audio stream is more important than the video stream due to its bit-rate being well above a typical audio bit-rate for the given video bit-rate. Conversely, where a piece of content has a high definition video stream with a bit-rate of 20 Mbps which is typically accompanied by an audio stream with a bit rate of 320 Kbps but the audio stream is mono with a bit-rate of 32 kbps at 16 khz, the video stream is identified as the primary stream based on the relatively higher quality of the video stream.

Generally, it is useful to identify a reliable stream as the primary stream and thus set the render clock based on the reliable stream so that playback can begin as soon as possible. For example with a cable music channel, the audio stream can be identified as the primary stream based on its being reliable relative to the video stream's sporadicness. In yet another embodiment, an audio stream is identified as the primary stream by default because it may be difficult to determine which stream is primary.

The metadata associated with a piece of content can be used to identify one or more primary streams based on where the content is selected from such as a channel guide, radio station listing, or media area in a media browser as opposed to the format of the content. For example, where a user is browsing an EPG the metadata may indicate that he or she is browsing an area with cable music channels. Thus, the metadata indicates that these channels deliver an experience that is audio-centric, and therefore that the audio stream is primary.

Active or currently being viewed or listened to streams are identified as the primary streams. It is appreciated that in the case where there are numerous streams, one or more streams may be identified as primary and one or more streams may be identified as secondary streams. For example in the case of a piece of media content having multiple audio streams containing different languages and multiple video streams having different camera angles, since a user will usually only be actively viewing or listening to a subset of the streams (e.g. one video and one audio stream), the active streams being viewed and listened to are identified as primary streams and those streams not being viewed or listened to as secondary streams.

Figure 5:
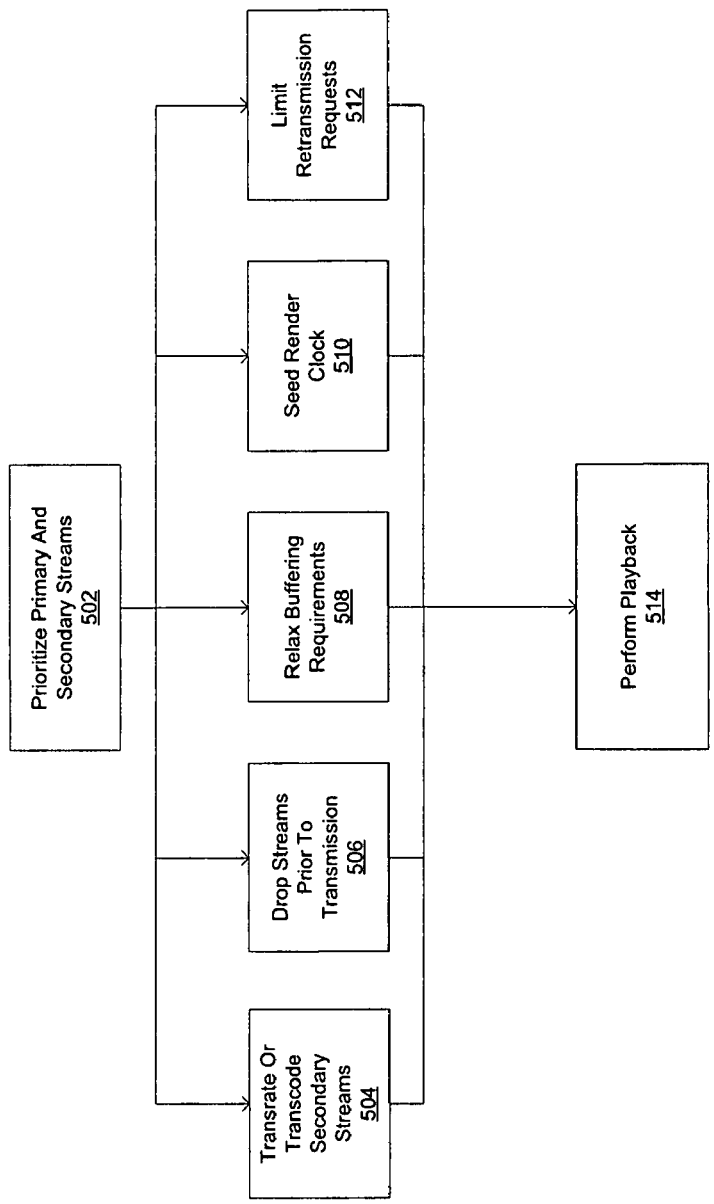
FIG. 5 is a flowchart of a process for prioritizing streams, in accordance with an embodiment.

FIG. 5 is a flowchart of an exemplary process 500 for prioritizing streams of media content, in accordance with an embodiment. Process 500 may be implemented on the operating environments described above. Process 500 is well-suited to be stored as instructions on a computer-readable medium. In an exemplary embodiment, process 500 operates on a media server or a media receiver. It is appreciated that not all steps of process 500 are necessary for the general goal of process 500 to be achieved. Moreover, it is appreciated that additional steps may also be included in process 500 in accordance with alternative embodiments.

At step 502, one or more primary streams and one or more secondary streams are prioritized to allow satisfactory playback. In one embodiment, playback and streaming parameters are adjusted throughout playback as environment resources change and when new primary and/or secondary streams are identified. It is appreciated that the following playback and streaming parameter adjustments may be performed individually or in combination towards facilitating satisfactory playback.

At step 504, the secondary streams are transrated or transcoded based on the available network bandwidth. For example, where the available bandwidth is 4 Mbps while the video stream requires 3 Mbps and the audio stream requires 2 Mbps for streaming with the video stream identified as the primary stream, the audio stream is transrated such that the bit-rate of the audio stream is reduced sufficiently so as to allow network streaming with available bandwidth. Alternatively, for example, the secondary audio stream may be transcoded from 5 channel to 2 channel audio to allow playback under current network conditions. If an audio stream is the primary stream, the video streams are transrated or transcoded, reducing the video bit-rate by using a more efficient encoder, by lowering the video quality, or by reducing the resolution of the video.

Secondary streams can be transrated more aggressively by dropping portions of the stream prior to sending them across the network. This further conserves network bandwidth and server resources. For example, a portion of the video data of a secondary video stream is dropped to reduce the required bandwidth for playback and network utilization.

At step 506, secondary streams are dropped prior to transmission to match playback requirements with the resources of the playback device. The playback device may have resource constraints such as a slow CPU or bus that reduces the rate at which data may be read from the buffer, which impacts the amount of data the device can receive. There may also be a relatively lower speed network connection. Secondary streams or portions thereof are dropped prior to transmission to meet constraints of the playback device and network connection. For example, if the playback device only has sufficient resources to receive 4 Mbps while the sum bit-rate of all audio and video tracks is 5 Mbps, secondary audio tracks or video streams can be dropped prior to transmission.

At step 508, buffering requirements for secondary streams are relaxed to allow playback of primary streams quickly. Before beginning playback, a certain amount of data known as preroll may be stored in a buffer to prevent interruptions to playback caused by changes in network resources such as network connection interruptions or bandwidth changes. At the beginning or restarting of playback, there is often a delay while the buffer fills with data. By relaxing the buffering requirements for secondary streams, playback begins as soon as the buffer for the primary stream is full. For example, with a cable music channel (as described above) video stream data is infrequent so there will be an extended period of delay before starting playback while waiting for the video stream buffer to fill. Having identified the audio stream as the primary stream and by relaxing the buffering requirements for the video stream, a playback device only has to wait for a sufficient amount of data in the primary stream to be buffered before beginning playback.

At step 510, the render clock of the playback device may be seeded based on the primary stream's timestamps. By doing this playback can begin as soon as a sufficient amount of data of the primary stream is available. For example, where a video stream has been identified as a primary stream either for the content overall or for the particular situation, the render clock may be seeded or set to begin with the timestamps of the available video samples and thus playback can start once a sufficient quantity of video samples of the primary stream arrive. Alternatively, the choice of primary stream may be updated as a result of skew between the timestamps of the originally identified primary and secondary streams. For example, if the video samples have timestamps starting at five seconds and the audio samples have timestamps starting at six seconds, after identifying a video stream as a primary stream, the render clock may be set off the video samples in order to begin playing video samples quickly, with the first second of video playing without accompanying audio. Instead, if the video samples have timestamps starting at ten seconds and the audio samples have timestamps starting at seven seconds, the render clock may be set based on the audio samples in order to avoid dropping three seconds of audio, with the first three seconds of audio playing without accompanying video.

At step 512, a portion of the requests for retransmission of data are dropped or not transmitted to further conserve network bandwidth. The fact that data is not being received suggests that the network has insufficient resources to reliably transmit data and making requests for retransmission only increases the bandwidth requirements for playback. For example if a video stream has been identified as a secondary stream, requests for retransmission of video samples are not made by the device or are not honored by the server in order to reduce the bandwidth utilization, which improves the probability that the primary stream, an audio stream for example, plays back smoothly.

At step 514, playback of media content is initiated with the modified playback parameters. Where the buffering requirements for the secondary streams have been relaxed, playback begins as soon as a sufficient amount of data has been buffered for the primary stream 1. With the render clock set off the timestamps of the primary stream, playback beings as soon as a sufficient quantity of samples of the primary streams arrive. Throughout playback the media receiver and media server may reprioritize the streams based on changes in network resources and primary and secondary stream classification. The media receiver and media server may transmit information to communicate the modified stream prioritization to each other.

Figure 6:
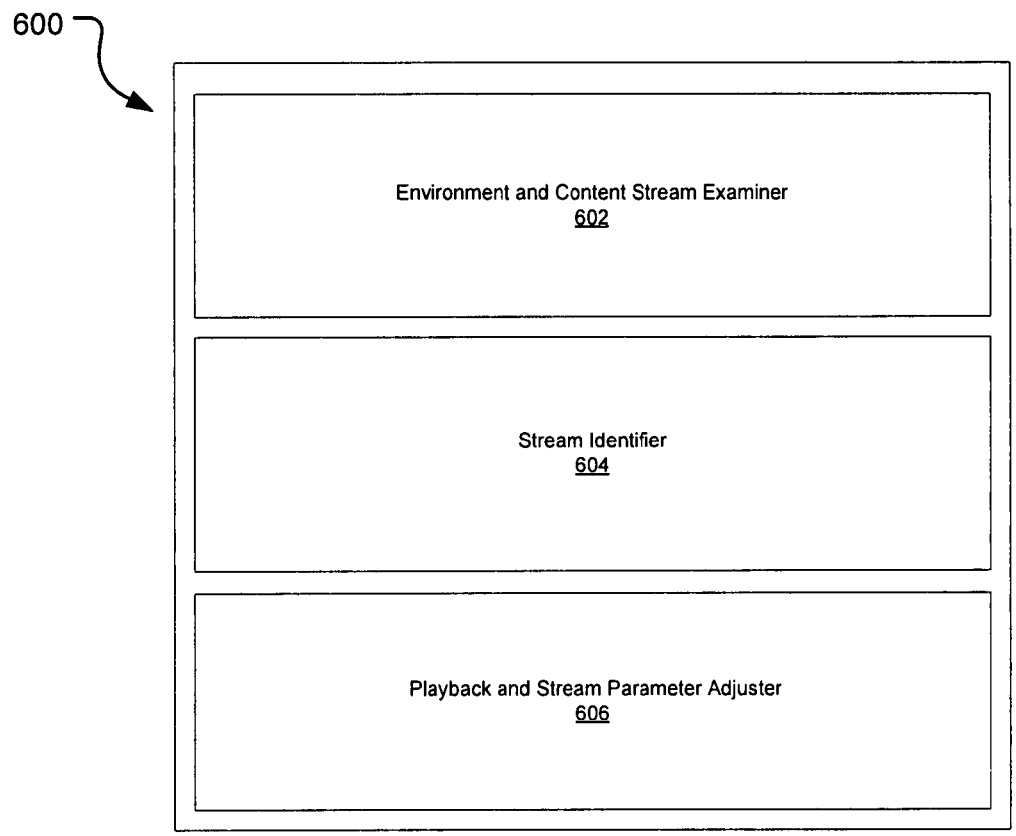
FIG. 6 shows components of a system for playback, in accordance with an embodiment.

FIG. 6 shows components of a system 600 for media content playback in accordance with one embodiment. System 600 examines the streams present in a piece of media content and identifies one or more primary and one or more secondary streams for the content overall or for a particular situation and then adjusts playback and streaming parameters to facilitate satisfactory playback. In the one embodiment, system 600 includes: environment and content stream examiner 602, stream identifier 604, and playback and stream parameter adjuster ("adjuster") 606.

It should be appreciated that aforementioned components of system 600 can be implemented in hardware or software or in a combination of both. In one embodiment, components and operations of system 600 can be encompassed by components and operations of one or more computer programs that execute on a media server (e.g., 302 in FIG. 3) or media receiver (e.g. 304 in FIG. 3). In another embodiment, components and operations of system 600 can be separate from the aforementioned one or more computer programs but can operate cooperatively with components and operations thereof.

Referring to FIG. 6, environment and content stream examiner ("examiner") 602 examines various characteristics of the media content prior to the commencement of and throughout playback. The characteristics of the media content streams examined can be substantially similar to the characteristics discussed above. The results of the examinations are then used by stream identifier 604 to identify one or more primary streams and one or more secondary streams of the media content overall or for a particular situation. It is appreciated that examiner 602 may examine additional characteristics and may examine individual or multiple characteristics before providing the results to stream identifier 604.

Stream Identifier 604 uses the results of examinations by examiner 602 to identify one or more primary streams and one or more secondary streams. The identification of streams can be performed in substantially the same way as described above. It is appreciated that there may be situations where there are numerous streams and there may be more than one primary stream and one or more secondary streams. It is further appreciated that one or more of the characteristics examined by the examiner 602 may be used individually or in combination to identify one or more primary streams and one or more secondary streams. After the one or more primary and one or more secondary streams have been identified by stream identifier 604, adjuster 606 can adjust playback and streaming parameters accordingly to ensure satisfactory playback.

After stream identifier 604 has identified one or more primary and one or more secondary streams, adjuster 606 adjusts playback and streaming parameters to favor playback of the primary stream or streams over the one or more secondary streams. The playback and streaming parameters can be adjusted in substantially the same way as above. In one embodiment, adjuster 606 adjusts playback and streaming parameters throughout playback as the resources available in the playback environment change and/or when stream identifier 604 identifies new primary and/or secondary streams. It is appreciated that the following playback and streaming parameter adjustments may be performed individually or in combination towards facilitating satisfactory playback.

Figure 7:
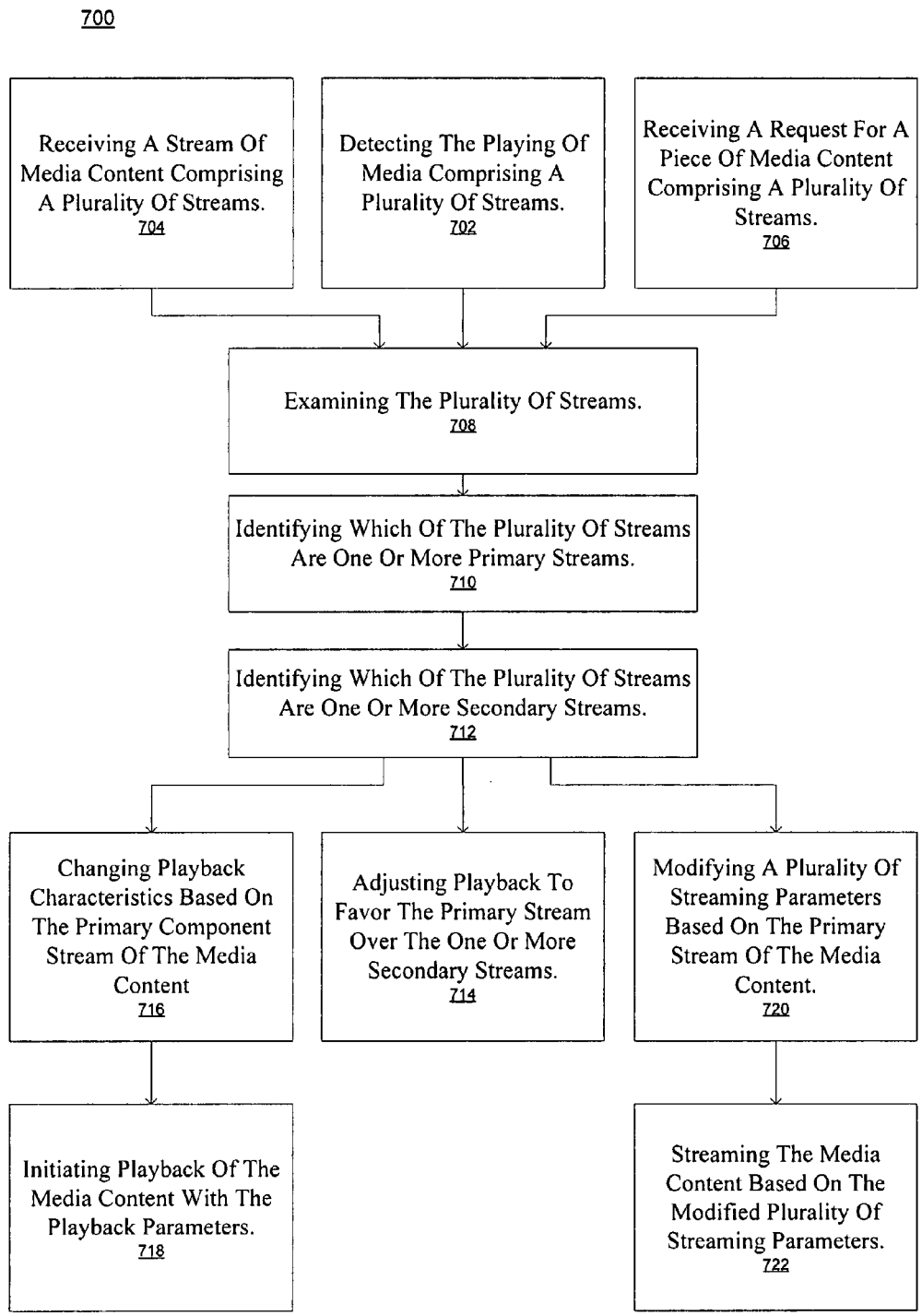
FIG. 7 is a flowchart of a process for performing playback on a playback device, in accordance with an embodiment.

FIG. 7 is a flowchart of an exemplary process 700 for performing playback, in accordance with an embodiment. Process 700 may be implemented on the operating environments described above. Process 700 is well-suited to be stored as instructions on a computer-readable medium. In an exemplary embodiment, process 700 operates on a media server and/or a media receiver. It is appreciated that not all steps of process 700 are necessary for the general goal of process 700 to be achieved. Moreover, it is appreciated that additional steps may also be included in process 700 in accordance with alternative embodiments.

At step 702, the playback of a piece of streaming media content comprising a plurality of streams is detected. The playback may be on a media receiver, as described above, of media that is streamed across a network from a media server.

The streaming media can be content that is being downloaded, received from a broadcast source, or stored on a media server.

At step 704, a stream of a piece of media content comprising a plurality of streams is received. The stream is received by a playback device such as a media receiver, described above, over a network from a media server. The streaming media can be content that is being downloaded, received from a broadcast source, or stored on a media server.

At step 706, a request is received for a piece of media content comprising a plurality of streams. The request is received by a media server for content to be streamed over a network to a media receiver. The streaming media can be content that is being downloaded, received from a broadcast source, or stored on a media server.

At step 708, the plurality of streams that make up the streaming media are examined. The plurality of streams may be examined prior to the beginning of playback to determine the various characteristics of the streams in the media. The streams may be examined in substantially the same way as described above. The results of the examinations can be used to identify one or more primary streams and one or more secondary streams. It is appreciated that additional characteristics may be examined.

At step 710, one or more primary streams is identified from among the plurality of streams present in the media content based on the previous examination of the streams. It is appreciated that there may be more than one primary stream. It is further appreciated that one or more of the characteristics examined previously may be used individually or in combination to identify one or more primary streams. The identification of streams can be performed in substantially the same way as described above.

At step 712, one or more secondary streams are identified from among the plurality of streams present in the media content. The identification of one or more secondary streams can be done in substantially the same way as described above. It is appreciated that in some situations, the one or more secondary streams may be identified based on being the other streams present with the one or more primary streams in a piece of media content. It is further appreciated that one or more of the characteristics examined previously may be used individually or in combination to identify one or more secondary streams.

At step 714, playback is adjusted to favor the one or more primary streams over the one or more secondary streams. Playback can be adjusted by changing playback and streaming parameters during playback as environment resources change and as new primary and secondary streams are identified. It is appreciated that the following playback and streaming parameter adjustments may be performed individually or in combination towards facilitating satisfactory playback. The playback device and media server streaming the content may communicate and synchronize the adjustments made to favor the playback of the one or more primary streams.

In one embodiment, secondary streams are transrated or transcoded based on the available network bandwidth. For example, where the available bandwidth is 4 Mbps while the video stream requires 3 Mbps and the audio stream requires 2 Mbps for streaming and the video stream is the primary stream, the audio stream is transrated such that the bit-rate of the audio stream is reduced sufficiently to allow playback with the available bandwidth. Alternatively, for example, a secondary audio stream may be transcoded from 6 channel to 2 channel audio to allow playback under current network conditions. In a situation where an audio stream is the primary stream, the secondary streams of video can be transcoded or transrated, reducing the video bit-rate by using a more efficient encoder, by lowering the video quality, or by reducing the video to a lower resolution.

Secondary streams can be transrated more aggressively by dropping samples of the stream before sending them across the network. This further conserves network bandwidth and server resources. For example, a portion of the video samples of a secondary video stream can be dropped to reduce the required bandwidth for playback and network utilization.

Network and server resource utilization can be reduced by making only a portion of the requests for retransmission of data not received on a playback device or by the server ignoring a portion of the retransmission requests. The reduction in retransmission requests reduces the bandwidth needed for streaming because portions of content are not being resent on a network that lacked the bandwidth to allow content to be received on the first transmission. This also reduces the server resources required for streaming because requests and retransmission of content are not performed. For example if a video stream has been identified as a secondary stream of a piece of content with a single video and single audio stream, a playback device may not request retransmission of video samples not received to reduce the bandwidth utilization, which helps ensure the primary audio stream can play smoothly.

Playback and streaming parameters can be adjusted based on the resources of the playback device to allow satisfactory playback. The playback device may have resource constraints such as a slow CPU or bus that reduces the rate at which data may be read from the buffer or a relatively lower speed network connection, either of which may impact the amount of data the device can receive. In order to allow satisfactory playback, samples of secondary streams or primary streams may be dropped prior to transmission over the network. Further, secondary streams may be transcoded or transrated as described above. For example, if the playback device only has sufficient resources to receive 4 Mbps while the sum bit-rate of all audio and video tracks is 5 Mbps, unimportant audio tracks or video streams such as secondary streams are dropped prior to transmission.

Buffering requirements for secondary streams can be relaxed to allow playback to begin quickly. Before beginning playback, a certain amount of data known as preroll may be stored in a buffer to prevent interruptions to playback caused by changes in network resources such as network connection interruptions or bandwidth changes. At the beginning or restarting of playback, there is often a delay while a stream buffer fills with that amount of data. By relaxing the buffering requirements for secondary streams, playback may begin as soon as a sufficient portion of the buffer for the primary stream is full. For example, with a cable music channel (as described above) video stream data is infrequent so there will be an extended period of delay before starting playback while waiting for the video stream buffer to fill. Having identified the audio stream as the primary stream and by relaxing the buffer requirement for the video stream, playback can begin as soon as a sufficient portion of the buffer for the audio stream is full.

The render clock of the playback device can be seeded or set based on the primary stream's timestamps so playback can begin as soon as a sufficient quantity of samples of the primary stream are available. For example, where a video stream has been identified as a primary stream, the render clock will be seeded or set to begin with the timestamps of the available video samples and thus playback can start once a sufficient quantity of video samples of the primary stream arrive. Alternatively, the choice of primary stream or streams may be updated as a result of skew between the timestamps of the originally identified primary and secondary streams. For example, if the video samples have timestamps starting at five seconds and the audio samples have timestamps starting at six seconds, having identified a video stream as a primary stream, setting the render clock off of the video samples allows playback to begin instead of waiting for the audio samples having timestamps of five seconds to arrive, with the first second of video playing without accompanying audio. However, if instead the video samples have timestamps starting at ten seconds and the audio samples have timestamps starting at seven seconds, the render clock may be set based on the audio samples in order to avoid dropping three seconds of audio, with the first three seconds of audio playing without accompanying video.

Non-active secondary streams can be dropped prior to transmission to conserve network resources. The non-active streams are not required for playback because they are not currently being viewed or listened to and therefore can be dropped without impacting playback. For example in the case of a piece of content having multiple audio streams containing different languages and multiple video streams having different camera angles, the user will usually only be actively viewing or listening to a subset of the streams (e.g. one video and one audio stream); therefore, the non-active streams may be dropped prior to transmission in order to conserve network resources.

At step 716, playback characteristics are changed based on the one or more primary streams of the media content. Playback characteristics can be changed throughout playback as the resources available in the playback environment resources change and as new primary and secondary streams are identified. It is appreciated that the following changes to playback characteristics may be performed individually or in combination towards facilitating satisfactory playback. The playback device may communicate and synchronize the characteristics made to favor the playback of the primary stream or streams with the device streaming the content. The playback characteristics changed can include: seeding the render clock, modifying buffering requirements, and making only a portion of the retransmission requests. The changes may be made in a substantially similar manner as described above.

At step 718, playback of the media content is initiated with the modified playback parameters. In cases where the buffering requirements for the secondary streams have been relaxed, playback begins as soon as the buffer for the primary stream is full. In one embodiment, the media content is streamed from a media server to a media receiver over a network. The media receiver playing the content may transmit information to communicate the modified playback parameters to the media server, or the server could communicate this information to the media receiver, or yet another device could communicate this information to the media server and/or the media receiver. This can include the identification of the one or more primary and secondary streams as well as active, currently being viewed, or listened to streams.

At step 720, a plurality of streaming parameters are modified based on the primary stream or streams of the media content. Streaming parameters can continue to be modified during playback as the resources available in the playback environment change and as new primary and secondary streams are identified. It is appreciated that the following streaming parameter modifications may be performed individually or in combination towards facilitating satisfactory playback. The media server streaming the content may communicate and synchronize the modifications made to favor the playback of the one or more primary streams to the playback device. The streaming parameter modifications can include: transrating or transcoding the streams, adjustments based on playback device resources, seeding of the render clock, and dropping non-active secondary streams prior to transmission. The modifications may be made in a substantially similar manner as described above.

At step 722, the media content is streamed based on the modified streaming parameters. The media content is streamed from a media server to a media receiver over a network. In one embodiment, the media server streaming the content transmits information to communicate the modified streaming parameters. This can include the identification of the one or more primary and secondary streams and seeding the render clock of the playback device.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for performing playback of media content comprising:

receiving a plurality of media streams for a piece of media content from a media server at a playback device, the plurality of media streams including a video stream for the piece of media content accompanied by an audio stream for the piece of media content, the playback device configured to perform playback of the plurality of media streams in accordance with buffering requirements that require a certain amount of data to be buffered from each of the video stream and the audio stream before playback of the piece of media content can begin;

examining the plurality of media streams to identify a primary stream and a secondary stream prior to playback, wherein examining the plurality of media streams comprises examining an audio bit-rate of the audio stream and a video bit-rate of the video stream and performing at least one of:

comparing the audio bit-rate of the audio stream to an audio bit-rate commonly used to accompany video streams encoded at the video bit-rate of the video stream, and comparing the video bit-rate of the video stream to a video bit-rate commonly used to accompany audio streams encoded at the audio bit-rate of the audio stream;

assigning one of the video stream and the audio stream as the primary stream and the other of the video stream and the audio stream as a secondary stream based on the examining of the plurality of media streams prior to the playback of the piece of media content;

adjusting playback parameters at the playback device to allow the playback of the primary stream to begin without playback of the secondary stream by relaxing the buffering requirements for the secondary stream so that playback of the primary stream can begin as soon as the certain amount of data required for the primary stream has been buffered and without waiting for the certain amount of data required for the secondary stream to be buffered; and communicating prioritization information identifying the primary stream and the secondary stream to the media server, wherein:
- the media server is configured to drop portions of the secondary stream in response to the prioritization information in order to conserve network bandwidth, and
- the playback device does not make retransmission requests for the portions of the secondary stream that are dropped by the media server in order to further conserve network bandwidth.

2. The method of claim 1 wherein examining the plurality of media streams includes examining media formats present in the plurality of media streams to identify whether one or more media streams guarantee a constant delivery rate.

3. The method of claim 1 wherein the playback parameters are adjusted at the playback device based on available network bandwidth.

4. The method of claim 1 further comprising comparing at least one of the audio bit-rate of the audio stream and the video bit-rate of the video stream to a bit-rate commonly used to accompany high definition media streams.

5. The method of claim 1 wherein examining the plurality of streams includes determining burstiness of the audio bit-rate of the audio stream and the video bit-rate of the video stream in the plurality of media streams.

6. The method of claim 1 wherein examining the plurality of media streams includes examining metadata associated with the piece of media content.

7. The method of claim 1 wherein examining the plurality of media streams includes examining multiple audio streams associated with the piece of media content.

8. The method of claim 1 wherein examining the plurality of media streams includes examining multiple video streams associated with the piece of media content.

9. A playback device comprising a processing unit executing computer-readable instructions stored in memory to perform a method for playback of media content, the method comprising:
- receiving a plurality of media streams for a piece of media content from a media server, the plurality of media streams including a video stream for the piece of media content accompanied by an audio stream for the piece of media content, the playback device configured to perform playback of the plurality of media streams in accordance with buffering requirements that require a certain amount of data to be buffered from each of the video stream and the audio stream before playback of the piece of media content can begin;
- examining the plurality of media streams to identify a primary stream and a secondary stream prior to playback, wherein examining the plurality of media streams comprises examining an audio bit-rate of the audio stream and a video bit-rate of the video stream and performing at least one of:
  - comparing the audio bit-rate of the audio stream to an audio bit-rate commonly used to accompany video streams encoded at the video bit-rate of the video stream, and
  - comparing the video bit-rate of the video stream to a video-bit rate commonly used to accompany audio streams encoded at the audio bit-rate of the audio stream;
- assigning one of the video stream and the audio stream as the primary stream and the other of the video stream and the audio stream as the secondary stream based on the examining of the plurality of media streams prior to the playback of the piece of media content;
- adjusting playback parameters to allow the playback of the primary stream to begin without playback of the secondary stream by relaxing the buffering requirements for the secondary stream so that playback of the primary stream can begin as soon as the certain amount of data required for the primary stream has been buffered and without waiting for the certain amount of data required for the secondary stream to be buffered; and
- communicating prioritization information identifying the primary stream and the secondary stream to the media server, wherein:
  - the media server is configured to drop portions of the secondary stream in response to the prioritization information in order to conserve network bandwidth, and
  - the playback device does not make retransmission requests for the portions of the secondary stream that are dropped by the media server in order to further conserve network bandwidth.

10. The playback device of claim 9 wherein the processor examines media formats present in the plurality of media streams to identify whether one or more media streams guarantee a constant delivery rate.

11. The playback device of claim 9 wherein the processor adjusts playback parameters based on available network bandwidth.

12. The playback device of claim 9 wherein the processor compares at least one of the audio bit-rate of the audio stream and the video bit-rate of the video stream to a bit-rate commonly used to accompany high definition media streams.

13. A computer-readable storage medium storing computer-readable instructions that, when executed, cause a computing device to perform a method for playback of media content, the method comprising:
- receiving a plurality of media streams for a piece of media content from a media server at a playback device, the plurality of media streams including a video stream for the piece of media content accompanied by an audio stream for the piece of media content, the playback device configured to perform playback of the plurality of media streams in accordance with buffering requirements that require a certain amount of data to be buffered from each of the video stream and the audio stream before playback of the piece of media content can begin;
- examining the plurality of media streams to identify a primary stream and a secondary stream prior to playback, wherein examining the plurality of media streams comprises examining an audio bit-rate of the audio stream and a video bit-rate of the video stream and performing at least one of:
  - comparing the audio bit-rate of the audio stream to an audio bit-rate commonly used to accompany video streams encoded at the video bit-rate of the video stream, and
  - comparing the video bit-rate of the video stream to a video bit-rate commonly used to accompany audio streams encoded at the audio bit-rate of the audio stream;
- assigning one of the video stream and the audio stream as the primary stream and the other of the video stream and the audio stream as a secondary stream based on the examining of the plurality of media streams prior to the playback of the piece of media content;
- adjusting playback parameters at the playback device to allow the playback of the primary stream to begin without playback of the secondary stream by relaxing the buffering requirements for the secondary stream so that playback of the primary stream can begin as soon as the certain amount of data required for the primary stream has been buffered and without waiting for the certain amount of data required for the secondary stream to be buffered; and communicating prioritization information identifying the primary stream and the secondary stream to the media server, wherein:

the media server is configured to drop portions of the secondary stream in response to the prioritization information in order to conserve network bandwidth, and the playback device does not make retransmission requests for the portions of the secondary stream that are dropped by the media server in order to further conserve network bandwidth.

14. The computer-readable storage medium of claim 13 further comprising computer-readable instructions for examining media formats present in the plurality of media streams to identify whether one or more media streams guarantee a constant delivery rate.

15. The computer-readable storage medium of claim 13 wherein the playback parameters are adjusted based on available network bandwidth.

16. The computer-readable storage medium of claim 13 further comprising computer-readable instructions for comparing at least one of the audio bit-rate of the audio stream and the video bit-rate of the video stream to a bit-rate commonly used to accompany high definition media streams.

17. The computer-readable storage medium of claim 13 further comprising computer-readable instructions for determining burstiness of the audio bit-rate of the audio stream and the video bit-rate of the video stream in the plurality of media streams.

18. The computer-readable storage medium of method of claim 13 further comprising computer-readable instructions for examining metadata associated with the piece of media content.

19. The computer-readable storage medium of claim 13 further comprising computer-readable instructions for examining multiple audio streams associated with the piece of media content.

20. The computer-readable storage medium of claim 13 further comprising computer-readable instructions for examining multiple video streams associated with the piece of media content.

* * * * *